US012676801B2

(12) United States Patent
Khare et al.

(10) Patent No.: US 12,676,801 B2
(45) Date of Patent: Jul. 7, 2026

(54) NETWORK REPOSITORY FUNCTION POLICY CONTROL FOR DIFFERENT PUBLIC LAND MOBILE NETWORKS

(71) Applicant: Nokia Technologies Oy, Espoo (FI)

(72) Inventors: Saurabh Khare, Bangalore (IN); Bruno Landais, Lannion (FR); Xin Wang, Qingdao (CN); Ulrich Wiehe, Munich (DE); Georgios Gkellas, Athens (GR)

(73) Assignee: Nokia Technologies Oy, Espoo (FI)

( * ) Notice: Subject to any disclaimer, the term of this patent is extended or adjusted under 35 U.S.C. 154(b) by 110 days.

(21) Appl. No.: 18/705,276

(22) PCT Filed: Oct. 26, 2021

(86) PCT No.: PCT/CN2021/126528
§ 371 (c)(1),
(2) Date: Apr. 26, 2024

(87) PCT Pub. No.: WO2023/070340
PCT Pub. Date: May 4, 2023

(65) Prior Publication Data
US 2025/0274358 A1 Aug. 28, 2025

(51) Int. Cl.
*H04L 41/5019* (2022.01)
*H04L 41/0894* (2022.01)

(52) U.S. Cl.
CPC ...... *H04L 41/5019* (2013.01); *H04L 41/0894* (2022.05)

(58) Field of Classification Search
CPC ..................... H04L 41/5019; H04L 41/0894
See application file for complete search history.

(56) References Cited

U.S. PATENT DOCUMENTS 10,613,884 B2 4/2020 Koganty et al.
10,833,938 B1 11/2020 Rajput et al.
(Continued)

FOREIGN PATENT DOCUMENTS

CN 113329417 A 8/2021
EP 3952403 A1 2/2022
(Continued)

OTHER PUBLICATIONS

Extended European Search Report received for corresponding European Patent Application No. 21961716.4, dated Jun. 12, 2025, 13 pages.
(Continued)

*Primary Examiner* — Hieu T Hoang
(74) *Attorney, Agent, or Firm* — Nokia Technologies Oy

(57) ABSTRACT

Embodiments of the present disclosure relate to devices, methods, apparatuses and computer readable storage media of NRF policy control for different PLMNs. The method comprises in accordance with a determination that a request for a service associated a second device is received from a third device, determining a target network function profile associated with the second device dedicated for the third device at least based on the profile configuration template, reference network function profile and a target network associated with the third device; and transmitting, to the third device, the target network function profile associated with the second device dedicated for the third device. With the solution of the present disclosure, a flexible NRF control policy can be achieved.

16 Claims, 6 Drawing Sheets

600

OBTAIN PROFILE CONFIGURATION TEMPLATE FOR SETTING ATTRIBUTES OF SET OF PROFILE PARAMETERS ASSOCIATED WITH ONE OR MORE CANDIDATE NETWORKS FROM FOURTH DEVICE

⟋ 610

DETERMINE TARGET NETWORK FUNCTION PROFILE DEDICATED FOR THIRD DEVICE REQUESTING SERVICE ASSOCIATED WITH SECOND DEVICE AT LEAST BASED ON PROFILE CONFIGURATION TEMPLATE

⟋ 620

(56) References Cited

U.S. PATENT DOCUMENTS

| | | | | |
|---|---|---|---|---|
| 2019/0230556 A1 | 7/2019 | Lee | | |
| 2021/0136162 A1 | 5/2021 | Young et al. | | |
| 2021/0235254 A1 | 7/2021 | Farooq | | |
| 2022/0015023 A1* | 1/2022 | De-Gregorio-Rodriguez | ............. H04W 48/18 | |
| 2022/0038999 A1* | 2/2022 | Sapra | ................... H04W 48/16 | |
| 2022/0150810 A1* | 5/2022 | Wang | ................... H04M 15/83 | |
| 2022/0353802 A1* | 11/2022 | Gupta | ................... H04W 48/16 | |
| 2023/0262459 A1* | 8/2023 | Li | ......................... H04L 67/303 | 455/410 |
| 2023/0269608 A1* | 8/2023 | Puente Pestaña | ..... H04W 24/10 | 370/252 |
| 2023/0276220 A1* | 8/2023 | Wang | ................... H04W 60/00 | 370/331 |

FOREIGN PATENT DOCUMENTS

| | | |
|---|---|---|
| WO | 2019/193129 A1 | 10/2019 |
| WO | 2021/040827 A1 | 3/2021 |

OTHER PUBLICATIONS

"3rd Generation Partnership Project; Technical Specification Group Core Network and Terminals; 5G System; Network Function Repository Services; Stage 3 (Release 16)", 3GPP TS 29.510, V16.9.0, Sep. 2021, pp. 1-217.

"3rd Generation Partnership Project; Technical Specification Group Services and System Aspects; Procedures for the 5G System (5GS); Stage 2 (Release 17)", 3GPP TS 23.502, V17.2.1, Sep. 2021, pp. 1-712.

"Network Repository Function (NRF) Cloud Native User's Guide", Oracle® Communications, Release 1.6.1, F30107-03, Jun. 2020, 93 pages.

"3rd Generation Partnership Project; Technical Specification Group Core Network and Terminals; 5G System; Network Function Repository Services; Stage 3 (Release 17)", 3GPP TS 29.510, V17.2.0, Jun. 2021, pp. 1-256.

Indian Application No. 202041033770, "Network Instance Registration Management", filed on Aug. 6, 2020, pp. 1-26.

International Search Report and Written Opinion received for corresponding Patent Cooperation Treaty Application No. PCT/CN2021/126528, dated Jul. 21, 2022, 9 pages.

* cited by examiner

NETWORK REPOSITORY FUNCTION POLICY CONTROL FOR DIFFERENT PUBLIC LAND MOBILE NETWORKS

CROSS-REFERENCE TO RELATED APPLICATIONS

This application is a national stage application, filed under 35 U.S.C. § 371, of International Patent Application No. PCT/CN2021/126528, filed on Oct. 26, 2021, which is hereby incorporated herein by reference.

FIELD

Embodiments of the present disclosure generally relate to the field of telecommunication and in particular to devices, methods, apparatuses and computer readable storage media of Network Repository Function (NRF) policy control for different public land mobile networks (PLMNs)

BACKGROUND

The 5G Core (5GC) Service Based Architecture (SBA) was introduced by Third Generation Partnership Project Services and System Aspects Work Group 2 (3GPP SA2), where Network Function (NF) profile or NF service profile stored in the NRF have a single set of profile parameters' values for all the PLMNs. That is, it is impossible for an NF to register different parameters' values for different PLMNs discovering the NF.

SUMMARY

In general, example embodiments of the present disclosure provide a solution of NRF policy control for different PLMNs.

In a first aspect, there is provided a first device. The first device comprises at least one processor; and at least one memory including computer program codes; the at least one memory and the computer program codes are configured to, with the at least one processor, cause the first device at least to in accordance with a determination that a request for a service associated with a second device is received from a third device, determine a target network function profile associated with the second device dedicated for the third device and transmit, to the third device, the target network function profile associated with the second device dedicated for the third device.

In a second aspect, there is provided a second device. The second device comprises at least one processor; and at least one memory including computer program codes; the at least one memory and the computer program codes are configured to, with the at least one processor, cause the second device at least to obtain a profile configuration template for setting attributes of a set of profile parameters associated with one or more candidate networks from a fourth device; and determine a target network function profile associated with the second device dedicated for a third device requesting a service associated with the second device at least based on the profile configuration template.

In a third aspect, there is provided a method. The method comprises in accordance with a determination that a request for a service associated with a second device is received from a third device, determining a target network function profile associated with the second device dedicated for the third device and transmitting, to the third device, the target network function profile associated with the second device dedicated for the third device.

In a fourth aspect, there is provided a method. The method comprises obtaining a profile configuration template for setting attributes of a set of profile parameters associated with one or more candidate networks from a fourth device; and determining a target network function profile associated with the second device dedicated for a third device requesting a service associated with the second device at least based on the profile configuration template.

In a fifth aspect, there is provided an apparatus comprising means for in accordance with a determination that a request for a service associated with a second device is received from a third device, determining a target network function profile associated with the second device dedicated for the third device and means for transmitting, to the third device, the target network function profile associated with the second device dedicated for the third device.

In a sixth aspect, there is provided an apparatus comprising means for obtaining a profile configuration template for setting attributes of a set of profile parameters associated with one or more candidate networks from a fourth device; and means for determining a target network function profile associated with the second device dedicated for a third device requesting a service associated with the second device at least based on the profile configuration template.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
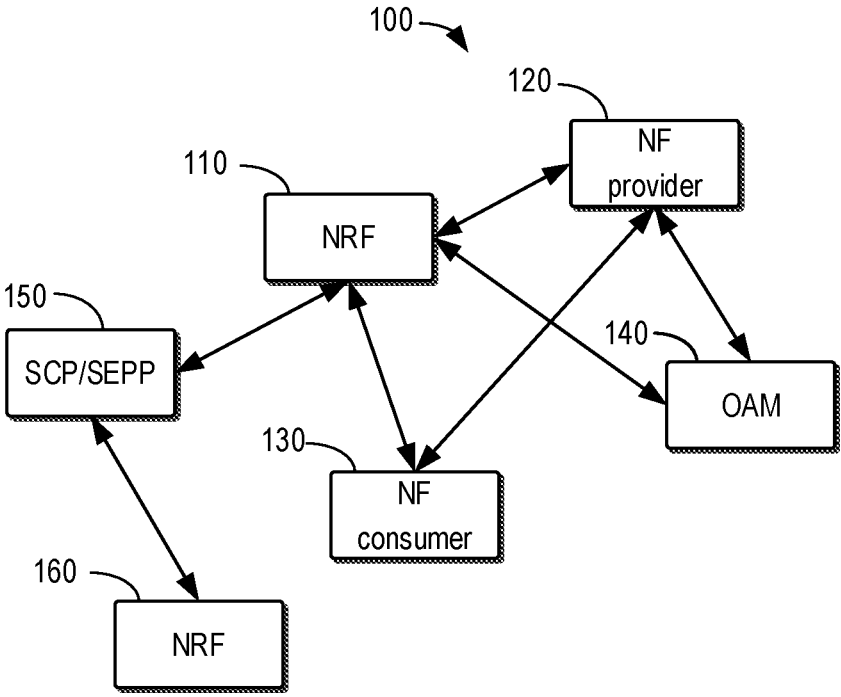
FIG. 1 illustrates an example environment in which example embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The communication network 100 may comprise a NRF 110 (hereinafter may also be referred to as a first device 110). In 5GC SBA, to be discovered and consumed by other NFs, each NF instance needs to be registered to the NRF. For example, the NRF 110 may support the corresponding functionalities, such as receiving NF Discovery Request from a NF instance, providing the information of the discovered NF instances (be discovered) to the NF instance and maintaining the NF profile of available NF instances and their supported services.

As shown in FIG. 1, the communication network 100 may comprise multiple NFs having capabilities for providing one or more specific services. For example, the communication network 100 may comprise a Network Function provider (NFp) 120 (hereinafter may also be referred to as a second device 120) and a Network Function consumer (NFc) 130 (hereinafter may also be referred to as a third device 130). In general, the NFc 130 may request a specific service provided from the NFp 120. In the communication network 100, the NFp 120 can be registered to the NRF 110.

Furthermore, the communication network 100 may also comprise an Operation Administration and Maintenance (OAM) entity 140 (hereinafter may also be referred to as a fourth device 140), which may be considered as a network management node. The OAM entity 140 may manage multiple NFs, such as the NFp 120. The OAM may also manage the NRF 110.

Moreover, the communication network 100 may also comprise a Service Communication Proxy (SCP) or a Security Edge Protection Proxy (SEPP) 150, which may act as a control point in the middle of the network core and may provide the indirect communication between the network elements. For example, as shown in FIG. 1, the SCP/SEPP can be considered as an intermediate node between the NRF 110 and a further NRF 160.

As described above, the NF profile or NF service profile stored in the NRF may have a single set of profile parameters' values for all the PLMNs. The parameter "AllowedPLMN" may be defined in the NF profile or NF service profile, which may state that either NF service can be discovered and accessed by a given remote PLMN or not. Therefore, the information exposed to different PLMNs can only be controlled at the granularity of an NF service (discoverable or not discoverable). Either NF or NF service can be exposed at the different PLMN or not. In this case, this parameter "AllowedPLMN" available in the NF profile can be used for preparing the response of NF Discovery and Access Token requests.

There are many other parameters in the NF profile and NF service profile, that the NRF's PLMN operator may not wish to expose to other PLMNs or that the NRF's PLMN operator may wish to expose with specific/manipulated values for a specific PLMN discovering the NF. For example, the parameters in the NF profile and NF service profile which may not be expected to expose may comprise at least one of the following:

Do not expose Internet Protocol (IP) address of the NF/NF service to remote PLMNs;

Do not expose Tracking Area Identities (TAIs) served by an NF to remote PLMNs;

Force to use a specific Hyper Text Transfer Protocol (HTTP) Scheme for (possibly specific) remote PLMNs;

Do not advertise the support of specific features to (possibly specific) remote PLMNs;

Do not expose service scope (area) supported by an NF to remote PLMNs;

Do not expose or expose with a different slice value certain slices; or

Enable or disable the use of the Service Access Authorization procedure (oauth2Required) for (possibly specific) remote PLMNs.

In conventional way, although some parameter control schemes have been proposed to support modifying IP/fqdn, which may avoid the potential security risk creating by exposing TAIs and IP address to other PLMN, it is impossible that the NRF's operator expose different values of the NF profile per PLMN.

Therefore, the present disclosure provides solutions of NRF policy control for different PLMNs. In this solution, if the NRF receives a request for a service associated with the NFp from a NFc, the NRF may determine a target network function profile dedicated for the NFc or for PLMN of the NFc. Then the NRF may transmit, to the NFc, the target network function profile dedicated for the NFc.

Principle and implementations of the present disclosure will be described in detail below with reference to FIGS. 2-4.

Figure 2:
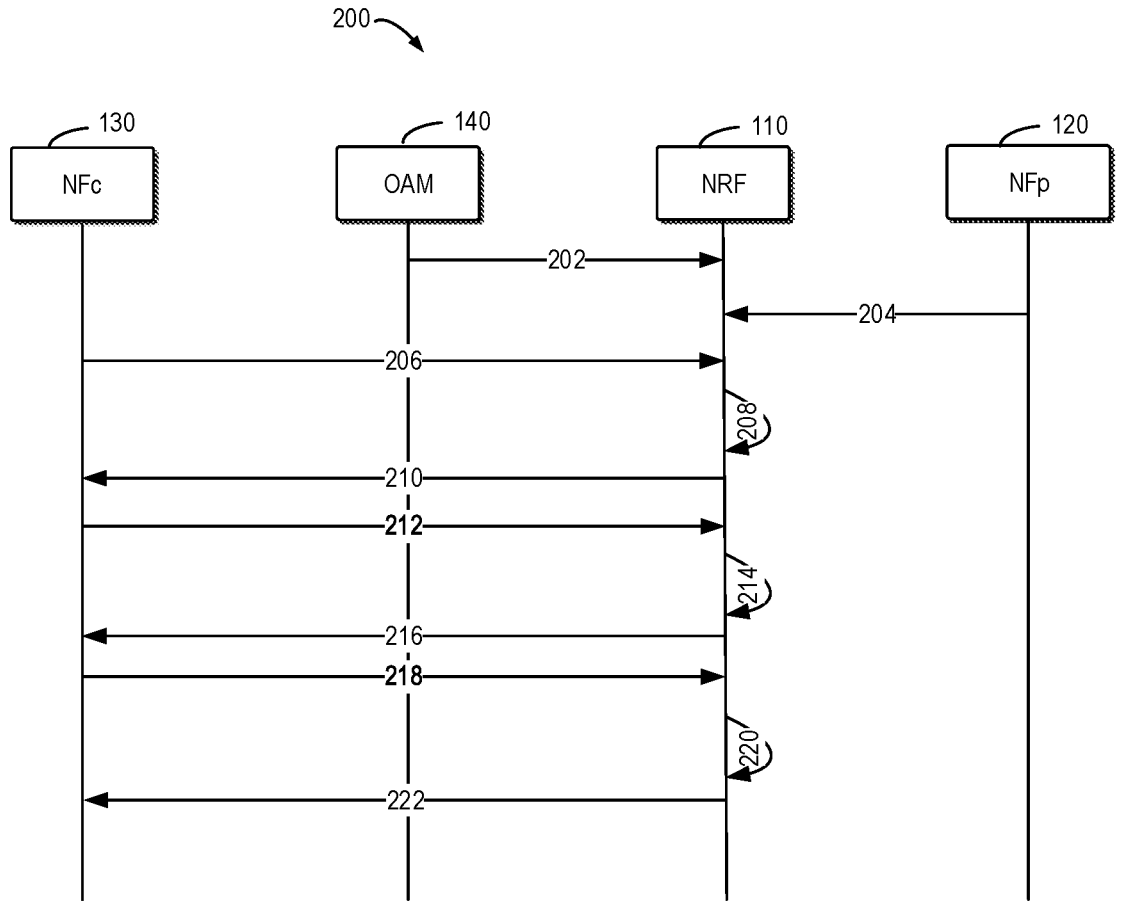
FIGS. 2-4 shows signaling charts illustrating processes of NRF policy control for different PLMNs according to some example embodiments of the present disclosure.

FIG. 2 shows a schematic process 200 of NRF policy control for different PLMNs. For the purpose of discussion, the process 200 will be described with reference to FIG. 1. The process 200 may involve the NRF 110, NFp 120, NFc 130 and the OAM 140 as illustrated in FIG. 1.

As shown in FIG. 2, the OAM 140 may configure a profile configuration template for the NRF 110. The profile configuration template can be configured for setting attributes of a set of profile parameters associated with different candidate PLMNs. For example, the profile configuration template may define what parameters can be exposed to which PLMN. Then the OAM 140 may provide 202 the profile configuration template to the NRF 110.

In some example embodiments, the profile configuration template may comprise an association between the setting attributes of the set of profile parameters and identifiers of the one or more PLMNs. Furthermore, the profile configuration template may comprise an association between the setting attributes of the set of profile parameters and NF types, NF sets that the NFs belongs to or the request types.

The NRF 110 may also obtain 204 a reference NF profile from the NFp 120 when the NFp 120 is registered on the NRF 110. In the scenario shown in FIG. 1, the NFp 120 and the NRF 110 are associated with a same PLMN.

If the NRF 110 receives a request for a service associated with the NFp 120 from the NFc 130, the NRF 110 may determine a target NF profile dedicated for the PLMN associated with the NFc 130. For example, the NRF 110 may generate the target NF profile based on the profile configuration template provided from the OAM 140, the PLMN associated with the NFc 130 and the reference NF profile provided from the NFp 120. That is, the NRF 110 may generate the target NF profile by modifying the profile parameters of the reference NF profile based on the PLMN associated with the NFc 130 and the profile configuration template.

In some example embodiments, the NRF 110 may determine the identifier of the PLMN associated with the NFc from the request and determine the target setting attributes of a set of target NF profile parameters based on the identifier, the reference NF profile and the profile configuration template.

status change needs to be sent to a subscribed NF from a different PLMN, and when building the notification payload. For example, if the NRF 110 receives 212 a subscription request for a service associated with the NFp 120 from the NFc 130, the NRF 110 may generate 214 a target NF profile dedicated for the PLMN associated with the NFc 130 by at least considering the profile configuration template and the PLMN associated with the NFc 130 to determine if the subscription request is accepted and transmit 216 response to the subscription request to the NFc 130 also sends the subscription change notification accordingly.

Moreover, the NRF 110 may also apply the profile configuration template while determining whether to grant access tokens. For example, if the NRF 110 receives 218 an access token request for a service associated with the NFp 120 from the NFc 130, the NRF 110 may generate 220 a target NF profile dedicated for the PLMN associated with the NFc 130 by at least considering the profile configuration template and the PLMN associated with the NFc 130 to determine if an access token can be granted and if yes, transmit 222 with the granted access token to the NFc 130.

For example, if the ID of the PLMN associated with the NFc 130 is "12345", a generated target NF profile dedicated for the PLMN associated with the NFc 130 may be represented as below:

TABLE 1

| An example of the PLMN specific profile | | |
|---|---|---|
| PLMNId = 12345, NFType = AMF, NFSet = abc | action | Example |
| URI | SET to https | All the URI changed to HTTPS |
| IP address | REMOVE | All IP address will be removed from the NFprofile |
| TAI | REMOVE | All TAIs will be removed from the NFprofile |
| Oauth2Required | SET: True | OAuth2Required will be set to True |
| Slice | SET: A, b, c | . . . |
| allowedOperationsPerNfType | SET: abc . . . . . . | |

Hereinafter the set of target network function profile parameters may comprise an Uniform Resource Identifier (URI), an IP address, a TAI, an authorization requirement, i.e. "Oauth2Required", a network slice associated with the requested service and an allowed operation related to the type of the NF associated with the NFc 130.

For determining the set of target NF profile parameters, the NRF 110 may obtain information associated with profile configuration from the request from the NFc 130. The information may comprise a type of a NF associated with the NFc 130, a NF set that the NFc 130 belongs to and/or the request type. The NRF 110 may determine the target setting attributes based on the information associated with profile configuration, the identifier, the reference NF profile and the profile configuration template.

The request transmitted from the NFc 130 may typically comprise a discovery request, a subscription request or an access token request.

As shown in FIG. 2, the NFc 130 may transmit 206 a discovery request for a service associated with the NFp 120 to the NRF 110. The NRF 110 may generate 208 a target NF profile dedicated for the PLMN associated with the NFc 130 and transmit 210 the target NF profile to the NFc 130.

Furthermore, the NRF 110 may also apply the profile configuration template when determining whether an NF It is to be understood that the setting of profile parameters can be modified and is not limited by the example as shown above.

If PLMN specific profiles are configured in the NRF 110, the NFp 120 may also need to have similar information.

As an option, the NFp 120 may also obtain the PLMN specific profiles from the OAM.

Figure 3:
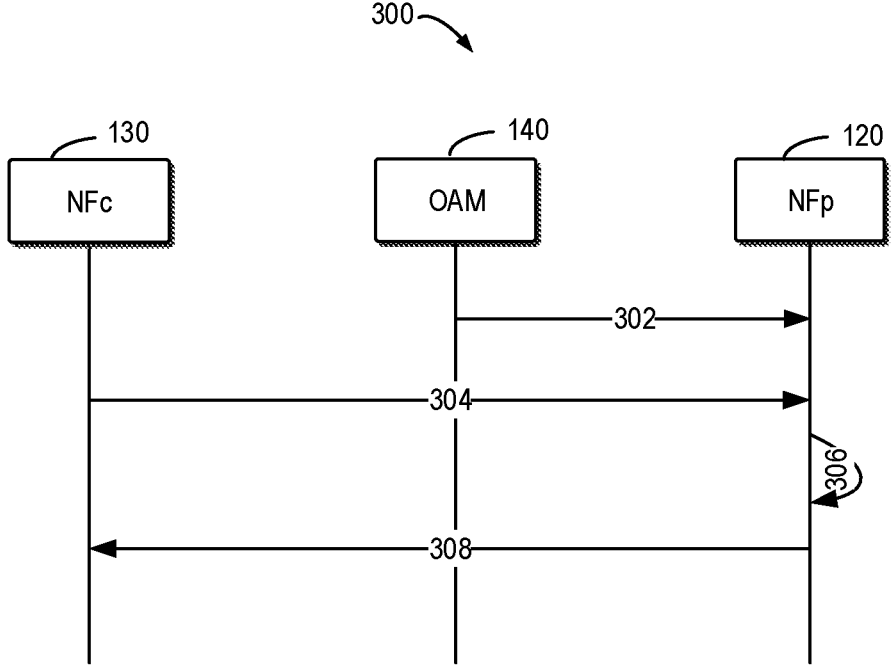

FIG. 3 shows a schematic process 300 of NRF policy control for different PLMNs. For the purpose of discussion, the process 300 will be described with reference to FIG. 1. The process 300 may involve the NFc 130, the OAM 140 and the NFp 120 as illustrated in FIG. 1.

As shown in FIG. 3, the NFp 120 may obtain 302 the target NF profile dedicated for the PLMN associated with the NFc 130 from the OAM. If the NFp 120 receives 304 a service request from NFc 130, the NFp 120 may determine 306 whether the service can be provided to the NFc 130 based on the target NF profile dedicated for the PLMN associated with the NFc 130. If the NFp 120 determines that the requested service is allowed to be provided to the NFc 130 based on the target NF profile, the NFp 120 may transmit 308 a response message indicating the request is accepted. Otherwise, the NFp 120 may transmit 308 a response message indicating the request is rejected.

In this way, when a service request is received at the NFp 120 without token, the NFp 120 can also decide either Oauth2.0 is allowed or not for the requester PLMN (associated with the NFc 130) and accordingly, reject or accept the message without Oauth2.0 token.

In some example embodiments, the PLMN specific profiles configured by the OAM may comprise two additional attributes, namely "perPlmnScheme" or "perPlmn-Oauth2Required". These attributes can be added in the NF profile of the NFp as a part of NF or NF service. The NFp may also register in the NRF with this updated NF profile. Then the NRF may handle access token/discovery/Subscribe request based on NF profile of NFp and additional new attributes, without the necessity to be configured by OAM on how to handle per target PLMN the http scheme and if OAuth is required. The NFp may also handle service request based on these two additional attributes available at its profile.

Furthermore, it is also possible that SCP and SEPP may also receive PLMN specific profile configuration through a Discovery procedure. FIG. 4 shows a schematic process 400 of NRF policy control for different PLMNs. For the purpose of discussion, the process 400 will be described with reference to FIG. 1. The process 400 may involve the NRF 110, the SCP/SEPP 150 and the further NRF 160 as illustrated in FIG. 1.

Figure 4:
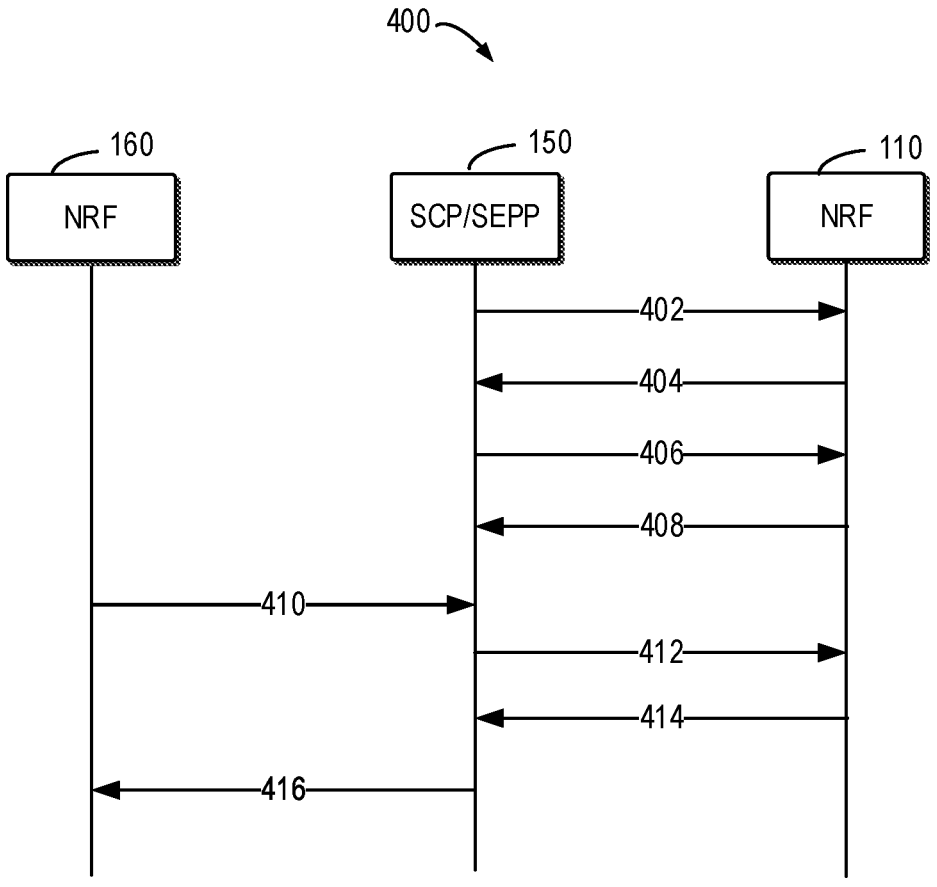

As shown in FIG. 4, the SCP/SEPP 150 may transmit 402 a discovery request to the NRF 110 for PLMN specific profiles. If the NRF 110 is configured with the PLMN specific profile, the NRF 110 may provide 404 the PLMN specific profile to the SCP/SEPP 150. The SCP/SEPP 150 may transmit 406 a subscription request to the NRF 110 to subscribe the PLMN specific profile. If the NRF 110 accepts the subscription request, the NRF 110 may respond the subscription request with message "OK".

If the SCP/SEPP 150 receives 410 a discovery request from the further NRF 160, which is associated with a different PLMN from the SCP/SEPP 150, the SCP/SEPP 150 may forward 412 the discovery request from the further NRF 160 to the NRF 110. The NRF 110 may provide the discovered NFp profiles without applying PLMN specific profile policy to the SCP/SEPP 150. The SCP/SEPP 150 may determine a PLMN specific NF profile based on corresponding PLMN specific profile policy and the PLMN associated with the further NRF 160, and provide 416 the PLMN specific NF profile to the further NRF 160.

In this way, the operator can enforce a new PLMN specific policy for discovery/Subscribe/Token request at the NRF/NFp and therefore a flexible NRF control policy can be achieved.

Figure 5:
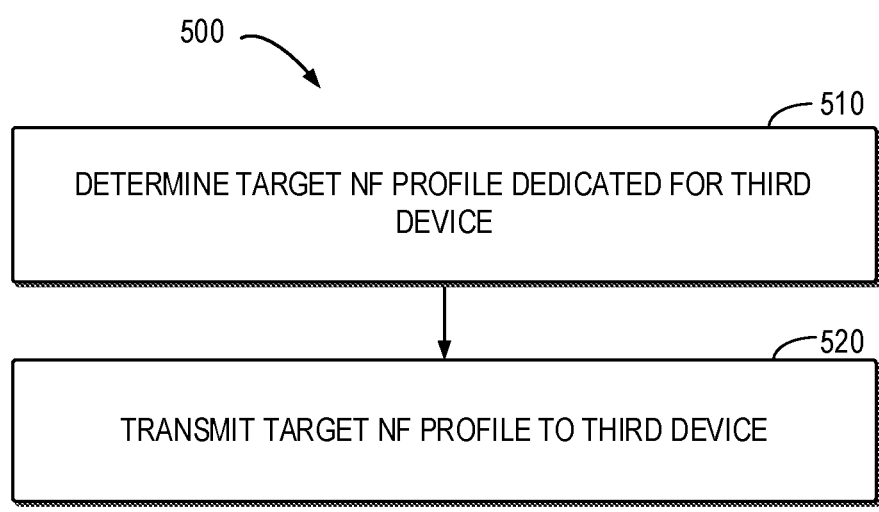
FIG. 5 shows a flowchart of an example method of NRF policy control for different PLMNs according to some example embodiments of the present disclosure.

FIG. 5 shows a flowchart of an example method 500 of NRF policy control for different PLMNs according to some example embodiments of the present disclosure. The method 500 can be implemented at the first device 110. For the purpose of discussion, the method 500 will be described with reference to FIG. 1.

At 510, if the first device determines that a request for a service associated with a second device is received from a third device, the first device determines a target network function profile associated with the second device dedicated for the third device.

At 520, the first device transmits, to the third device, the target network function profile associated with the second device dedicated for the third device.

In some example embodiments, the first device may obtain the reference network function profile for the second device from the second device or from a fourth device, obtain a profile configuration template for setting attributes of a set of profile parameters associated with one or more candidate networks from a fourth device and determine the target network function profile associated with the second device dedicated for the third device based on the profile configuration template, reference network function profile and a target network associated with the third device.

In some example embodiments, the first device may determine an identifier of the target network associated with the third device from the request; determine target setting attributes of a set of target network function profile parameters at least based on the identifier of the target network and the profile configuration template and the reference network function profile for the second device; and generate the target network function profile for the second device dedicated for the third device based on the target setting attributes of the set of target network function profile parameters.

In some example embodiments, the first device may obtain information associated with profile configuration from the request comprising at least one of a type of a network function associated with the second device, a network function set that the second device belongs to, or a type of the request from the third device; and determine the target setting attributes of the set of target network function profile parameters based on the identifier of the target network, the profile configuration template, the reference network function profile for the second device and the information associated with profile configuration.

In some example embodiments, the profile configuration template indicates at least one of setting a parameter in the set of profile parameters to a specific value; removing a parameter from the set of profile parameters; and adding a parameter to the set of profile parameters.

In some example embodiments, the profile configuration template indicate an association between the setting attributes of the set of profile parameter and at least one of identifiers of the one or more networks; types of a network function, network function sets that the network function belongs to, or types of the request.

In some example embodiments, the set of target network function profile parameters comprises at least one of an uniform resource identifier, an internet protocol address, a tracking area identity, an authorization requirement, a slice associated with the service, or an allowed operation related to the type, an allowed operation related to the type of the network function associated with the third device.

In some example embodiments, the type of the request comprises at least one of a network function discovery request, a subscription request to receive notifications about changes of a network function, or an access token request to access the service of a network function.

In some example embodiments, the first device may obtain, from the reference network function profile, respective settings for at least one parameter related to different target networks; determine an identifier of the target network associated with the third device from the request; and determine, based on the identifier, the target network function profile by removing the settings that fails to be corresponding to the identifier of the target network.

In some example embodiments, the first device may obtain the target network function profile from the second device.

In some example embodiments, the first device may comprise a NRF entity, the second device may comprise a network function service provider and the third device comprises a network function service consumer.

In some example embodiments, the fourth device may comprise an operation administration and maintenance entity.

Figure 6:
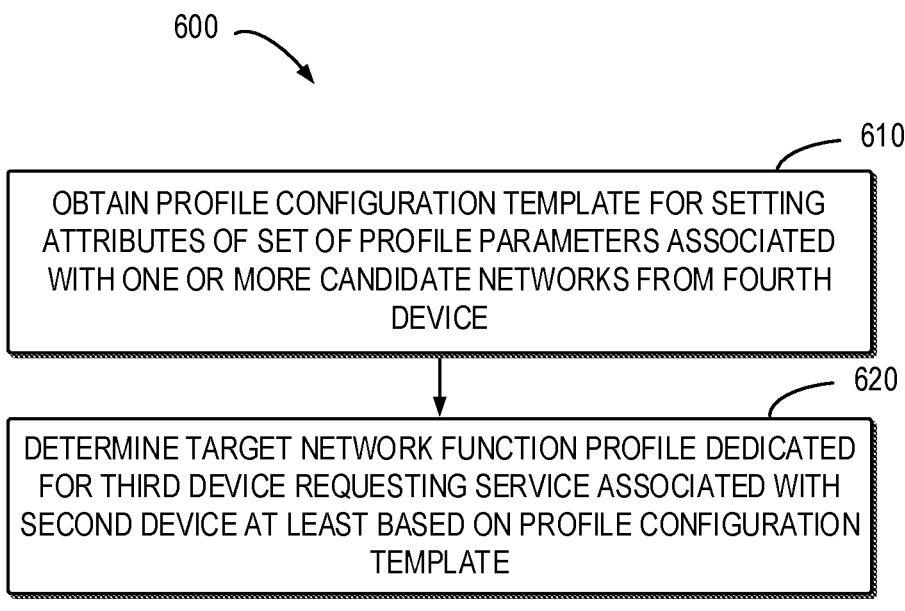
FIG. 6 shows a flowchart of an example method of NRF policy control for different PLMNs according to some example embodiments of the present disclosure.

FIG. 6 shows a flowchart of an example method 600 of NRF policy control for different PLMNs according to some example embodiments of the present disclosure. The method 600 can be implemented at the second device 120. For the purpose of discussion, the method 600 will be described with reference to FIG. 1.

At 610, the second device obtains a profile configuration template for setting attributes of a set of profile parameters associated with one or more candidate networks from a fourth device.

At 620, the second device determines a target network function profile associated with the second device dedicated for a third device requesting a service associated with the second device at least based on the profile configuration template.

In some example embodiments, the profile configuration template indicating an association between the setting attributes of the set of profile parameter and identifiers of the one or more networks.

In some example embodiments, the target network function profile is associated with a target network associated with the third device, and at least one of an Oauth2.0 authorization requirement for the target network associated with the third device; and an Hypertext Transfer Protocol scheme.

In some example embodiments, the second device may provide the target network function profile to the first device.

In some example embodiments, the second device may generate a response for the service requested by the third device based on the target network function profile.

In some example embodiments, the second device may comprise a network function provider, the third device may comprise a network function consumer and the fourth device may comprise an operation administration and maintenance entity.

In some example embodiments, the first device may comprise a network repository function entity.

In some example embodiments, an apparatus capable of performing the method 500 (for example, implemented at the NRF 110) may comprise means for performing the respective steps of the method 500. The means may be implemented in any suitable form. For example, the means may be implemented in a circuitry or software module.

In some example embodiments, the apparatus comprises means for in accordance with a determination that a request for a service associated with a second device is received from a third device, determining a target network function profile associated with the second device dedicated for the third device and means for transmitting, to the third device, the target network function profile associated with the second device dedicated for the third device.

In some example embodiments, an apparatus capable of performing the method 600 (for example, implemented at a NFp 120) may comprise means for performing the respective steps of the method 600. The means may be implemented in any suitable form. For example, the means may be implemented in a circuitry or software module.

In some example embodiments, the apparatus comprises means for obtaining a profile configuration template for setting attributes of a set of profile parameters associated with one or more candidate networks from a fourth device; and means for determining a target network function profile associated with the second device dedicated for a third device requesting a service associated with the second device at least based on the profile configuration template.

Figure 7:
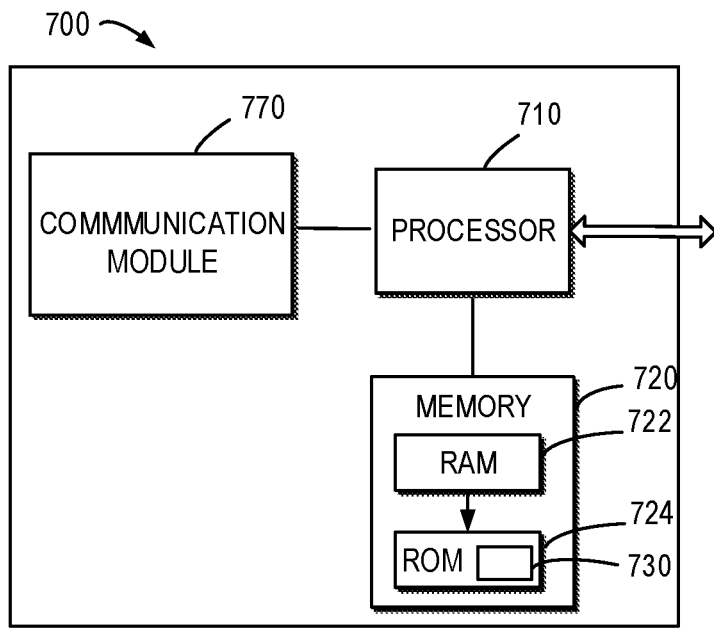
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the NRF 110 and the NFp 120 as shown in FIG. 1. As shown, the device 700 includes one or more processors 710, one or more memories 720 coupled to the processor 710, and one or more communication modules 770 coupled to the processor 710.

The communication module 770 is for bidirectional communications. The communication module 770 has one or more communication interfaces to facilitate communication with one or more other modules or devices. The communication interfaces may represent any interface that is necessary for communication with other network elements. In some example embodiments, the communication module 770 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2 to 4. The embodiments of the present disclosure may also be implemented by hardware or by a combination of software and hardware.

Figure 8:
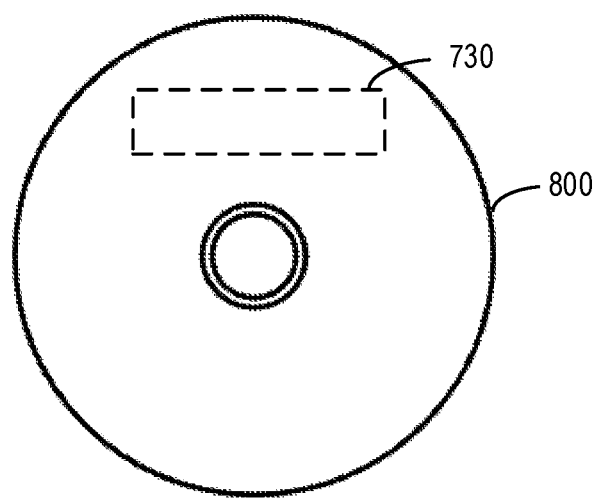
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device comprising:
   at least one processor; and
   at least one memory including instructions of a network repository function, wherein the instructions, when executed by the at least one processor, cause the device to perform operations, the operations comprising:
   receiving, from a network function service consumer of a network, a discovery request for a network function profile associated with a network function service provider, wherein the network service provider is configured to provide one or more services;
   obtaining, from the network function service provider or from an operations and maintenance entity, a reference network function profile for the network function service provider;
   obtaining, from the operations and maintenance entity, a profile configuration template associated with the network associated with the network function service consumer, the profile configuration template to be used for setting attributes of a set of parameters of a network function profile associated with the network function provider that is dedicated for the network function service consumer of the network;
   determining the network function profile associated with the network function provider that is dedicated for the network function service consumer of the network based on the profile configuration template and the reference network function profile for the network function service provider; and
   transmitting, to the network function service consumer associated with the network, the network function profile associated with the network function service provider that is dedicated for the network function service consumer associated with the network.

2. The device as claimed in claim 1, wherein the determining network function profile associated with the network function provider for the network function service consumer associated with the network based on the profile configuration template and the reference network function profile for the network function service provider further comprises:
   modifying the reference network function profile based on the profile configuration template.

3. The device as claimed in claim 1, wherein the discovery request comprises an identifier of the network, and wherein the obtaining, from the operations and maintenance entity, the profile configuration template associated with the network associated with the network function service consumer is based on the identifier of the network, and wherein the determining the network function profile associated with the network function provider that is dedicated for the network function service consumer of the network comprises:

determining the attributes of the set of parameters of the network function profile associated with the network function provider that is dedicated for the network function service consumer of the network based on the profile configuration template and the reference network function profile for the network function service provider.

4. The device as claimed in claim 3, wherein the determining the attributes comprises:

obtaining information associated with a profile configuration for the reference network function profile based on at least one of the following:

a type of a network function associated with the network function service provider; or a network function set that the network function service provider belongs to;

and determining the attributes of the set of parameters is further based on the information associated with the profile configuration.

5. The device as claimed in claim 1, wherein the profile configuration template indicates to perform at least one of the following:

setting a parameter included in the set of parameters to a specific value;

removing a parameter from the set of parameters; or adding a parameter to the set of parameters.

6. The device as claimed in claim 1, wherein the profile configuration template indicates an association between the attributes of the set of parameter and at least one of the following:

an identifier of the network;

types of a network function associated with the network function service provider; or network function sets that the network function associated with the network function service provider belongs to.

7. The device as claimed in claim 3, wherein the set of parameters comprises at least one of the following:

an uniform resource identifier;

an internet protocol address;

a tracking area identity;

an authorization requirement;

a network slice associated with the service; or an allowed operation related to the type of the network function associated with the network function service consumer.

8. The device as claimed in claim 1, wherein the discovery request comprises an identifier of the network, and wherein the determining the network function profile comprises:

obtaining, from the reference network function profile, respective settings for at least one parameter related to the network; and determining the network function profile by removing the settings that fail to correspond to the identifier of the network.

9. A method comprising:

receiving, by a network repository function from a network function service consumer of a network, a discovery request for a network function profile associated with a network function service provider configured to provide one or more;

obtaining, by the network repository function from the network function service provider or from an operations and maintenance entity, a reference network function profile for the network function service provider;

obtaining, from the operations and maintenance entity, a profile configuration template associated with the network associated with the network function service consumer, the profile configuration template to be used for setting attributes of a set of parameters of a network function profile associated with the network function provider that is dedicated for the network function service consumer of the network;

determining, by the network repository function, the network function profile associated with the network function provider that is dedicated for the network function service consumer of the network based on the profile configuration template and the reference network function profile for the network function service provider; and transmitting, by the network repository function to the network function service consumer, the network function profile associated with the network function service provider that is dedicated for the network function service consumer.

10. The method of claim 9, wherein the determining, by the network repository function, network function profile associated with the network function provider for the network function service consumer associated with the target network based on the profile configuration template and the reference network function profile for the network function service provider comprises:

modifying the reference network function profile based on the profile configuration template.

11. The method of claim 10, wherein discovery request comprises an identifier of the network, and wherein the obtaining, from the operations and maintenance entity, the profile configuration template associated with the network associated with the network function service consumer, and wherein the determining, by the network repository function, the network function profile associated with the network function provider that is dedicated for the network function service consumer of the network comprises:

determining, by the network repository function, the attributes of the set of parameters of the network function profile associated with the network function provider that is dedicated for the network function service consumer of the network based on the profile configuration template and the reference network function profile for the network function producer.

12. The method of claim 11, wherein the determining the attributes comprises:

obtaining, by the network repository function, information associated with a profile configuration from the request comprising at least one of the following:

a type of a network function associated with the network function service provider, a network function set that the network function service provider belongs to;

and wherein the determining the attributes of the set of target network function profile parameters is further based on the information associated with profile configuration.

13. The method as claimed in claim 9, wherein the profile configuration template indicates to perform at least one of the following:

setting a parameter included in the set of profile parameters to a specific value;

removing a parameter from the set of profile parameters; or adding a parameter to the set of profile parameters.

14. The device as claimed in claim 9, wherein the profile configuration template indicates an association between the attributes of the set of profile parameter and at least one of the following:

an identifier of the network;

types of a network function associated with the network function service provider; or network function sets that the network function associated with the network function service provider belongs to.

15. The method as claimed in claim 12, wherein the set of network function profile parameters comprises at least one of the following:

an uniform resource identifier;

an internet protocol address;

a tracking area identity;

an authorization requirement;

a network slice associated with the service; or an allowed operation related to the type of the network function associated with the network function service consumer.

16. The method as claimed in claim 9, wherein the discovery request comprises an identifier of the network, and wherein the determining the network function profile comprises:

obtaining, by the network repository function from the reference network function profile, respective settings for at least one parameter related to the network;

determining, by the network repository function, the network function profile by removing the settings that fail to correspond to the identifier of the network.

\* \* \* \* \*